US011981474B2

(12) United States Patent
Bardini

(10) Patent No.: US 11,981,474 B2
(45) Date of Patent: May 14, 2024

(54) MACHINE AND METHOD FOR LABELING CONTAINERS

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 17/914,813

(22) PCT Filed: Mar. 26, 2021

(86) PCT No.: PCT/EP2021/057942
§ 371 (c)(1),
(2) Date: Sep. 27, 2022

(87) PCT Pub. No.: WO2021/198072
PCT Pub. Date: Oct. 7, 2021

(65) Prior Publication Data

US 2023/0137654 A1 May 4, 2023

(30) Foreign Application Priority Data

Apr. 2, 2020 (IT) ........................ 102020000006937

(51) Int. Cl.
*B65C 9/18* (2006.01)
*B65C 9/22* (2006.01)
*B65C 9/42* (2006.01)

(52) U.S. Cl.
CPC ............ *B65C 9/1807* (2013.01); *B65C 9/226* (2013.01); *B65C 9/42* (2013.01)

(58) Field of Classification Search
CPC ... B65C 9/1807; B65C 9/1815; B65C 9/1819; B65C 9/1826; B65C 9/226; B65C 9/42; B65C 2009/1838
See application file for complete search history.

(56) References Cited

U.S. PATENT DOCUMENTS 4,632,721 A 12/1986 Hoffman et al.
2015/0239598 A1 8/2015 Schinelli
2017/0081070 A1 * 3/2017 Bardini .................... B65C 9/32

FOREIGN PATENT DOCUMENTS

DE 102014223594 A1 5/2016
WO 2015/173091 A1 11/2015
WO 2018/114618 A1 6/2018

OTHER PUBLICATIONS

Ministry of Economic Development, Search Report and Opinion (with English translation), Italian Patent Application No. 102020000006937, 8 pages, Dec. 17, 2020.

(Continued)

*Primary Examiner* — George R Koch
(74) *Attorney, Agent, or Firm* — THOMPSON HINE LLP

(57) ABSTRACT

A machine for labeling containers, which includes a transfer drum, fed by an unwinding assembly for unwinding a labeling ribbon, which is provided with cutting elements which are mutually angularly spaced apart around an axis thereof; the unwinding assembly is drivable by control elements which are adapted to command, during the rotation of the transfer drum about its own axis, at least one variation of the feeding speed of the labeling ribbon, with respect to the peripheral speed of the transfer drum; the control elements are adapted to command at least one first slowing of the feeding speed of the labeling ribbon during the activation of the cutting device.

7 Claims, 8 Drawing Sheets

(56) References Cited

OTHER PUBLICATIONS

European Patent Office (ISA/EP), International Search Report, International Application No. PCT/EP2021/057942, 4 pages, May 14, 2021.
European Patent Office (ISA/EP), Written Opinion of the International Searching Authority, International Application No. PCT/EP2021/057942, 6 pages, May 14, 2021.

* cited by examiner

MACHINE AND METHOD FOR LABELING CONTAINERS

This application is a 371 of PCT/EP2021/057942, filing date Mar. 26, 2021.

The present invention relates to a machine and a method for labeling containers.

As is known, labeling machines comprise, generally, a conveyor that transports the containers to be labeled along an advancement path and which is, typically, constituted by a rotating carousel, provided with a plurality of supports for the individual containers, which can make the containers themselves rotate about their own axes.

Along the advancement path defined by the conveyor of the containers there is at least one labeling assembly, which in turn is provided with a respective transfer drum, rotationally actuated, which makes it possible to apply, on each container that is progressively presented before the transfer drum, a label which is obtained by cutting a continuous labeling ribbon on which a plurality of labels are printed in succession and which is taken from a reel.

The labeling ribbon can have, on the face intended to make contact with the containers, preapplied lines of adhesive at the leading and trailing edges of the individual labels, along the direction of advancement of the labeling ribbon, or on the entire surface of each label.

Alternatively, the labeling ribbon can be without preapplied adhesive and, in such case, the labeling machines are provided with an adhesive spreading assembly which spreads the adhesive on the labels at the moment of use i.e. just before the labels are applied on the containers.

In the known art, labeling machines designed to handle labeling ribbons without preapplied adhesive usually have, upstream of the transfer drum, along the direction of advancement of the labeling ribbon from its reel to the transfer drum, an unwinding assembly which takes the labeling ribbon from the respective reel and feeds it to a cutting drum which cuts the labeling ribbon, between one label and the next, and subsequently transfers the individual labels, separated after cutting, to the transfer drum, which keeps them adhered to its lateral surface by way of a forced suction of air achieved using suction holes defined on its lateral surface.

In this case, the adhesive spreading assembly faces the transfer drum laterally, and is normally constituted by an adhesive spreading roller and applies, on the individual labels resting on the transfer drum, two strips of adhesive, at their leading and trailing edges, before the labels are transferred by the transfer drum to adhere to the containers transported by the conveyor.

In particular, the transfer drum is divided, along its circumferential extension, into sectors or divisions, each one of which is adapted to receive a single label from the cutting drum. At opposite ends of the various sectors of the transfer drum are two adhesive bonding zones, which are in relief with respect to the main lateral surface of the transfer drum and are defined by respective blocks, usually called runners or skids, on which the leading and trailing edges of the labels come to rest, so that when the labels pass in front of the adhesive spreading roller, the latter applies only two strips of adhesive to those labels, at their leading and trailing edges.

Since individual separated labels adhere to the transfer drum, in traditional machines it often happens that the spreading roller can smear the transfer drum with adhesive, which results in the machine having to be shut down in order to carry out the necessary cleaning thereof.

To solve this and other problems of conventional labeling machines, a labeling machine has been proposed, described in Italian patent no. 102016000128413 in the name of this same Applicant, wherein the transfer drum is fed directly by the unwinding assembly with a continuous labeling ribbon and is, moreover, provided with cutting means, distributed around its lateral surface, which are activated on command by respective actuation means, to cut the labeling ribbon fed to the transfer drum at the separation zone between two consecutive labels; and wherein the adhesive spreading roller applies at least one line of adhesive on the labels while they are still on the labeling ribbon, before the labels are separated from the labeling ribbon as a consequence of the actuation of the cutting means.

In particular, each one of the cutting means of such labeling machine is constituted by a respective blade, which is integrally fixed to the transfer drum and is accommodated in a corresponding suction chamber, which is open at the lateral surface of the transfer drum and connected to air suction means, which make it possible to attract the labeling ribbon inward into the chamber and against the blade, so as to result in the cutting thereof.

This labeling machine is, furthermore, provided with control means that make it possible to vary the feeding speed of the labeling ribbon to the transfer drum by the unwinding assembly, during the rotation of the transfer drum, so as to determine steps of operation of the machine, in which the feeding speed of the labeling ribbon is the same as the transfer speed of the labels or as the peripheral speed of the transfer drum, between which other steps of operation of the machine are interleaved in which the feeding speed of the labeling ribbon to the transfer drum is, differently, slower than the transfer speed of the labels.

In particular, starting from a situation in which the feeding speed of the labeling ribbon and the transfer speed of the labels are equal, the control means command a first slowing of the feeding speed of the labeling ribbon, with respect to the transfer speed of the labels, in order to position the cutting means at the separation zone between the two consecutive labels on which the spreading roller has previously applied the adhesive, and afterward the control means restore the feeding speed of the ribbon to the same value as the transfer speed of the labels, and a second slowing of the feeding speed of the labeling ribbon, with respect to the transfer speed of the labels, after the activation of the cutting means and the consequent complete separation of a label from the labeling ribbon, in order to move the cut label away from the rest of the labeling ribbon, following which the feeding speed of the labeling ribbon is returned to the same value as the transfer speed of the labels by the control means.

Although this machine has been shown to be conceptually valid, it has been found that, in the presence of vacuum leaks in the suction chambers or in the event of wear of the blades of the cutting means, some cutting operations of the labels may not happen, or may happen incompletely, resulting in the stoppage of the machine.

The aim of the present invention is to provide a labeling machine that is capable of improving the known art in one or more of the above mentioned aspects.

Within this aim, an object of the invention is to provide a labeling machine that is capable of ensuring the execution of the cutting of the labels even with blades that are relatively worn.

Another object of the invention is to provide a labeling machine that is capable of carrying out the cutting of the labels even under suboptimal conditions of suction of the labeling ribbon.

Another object of the invention is to provide a labeling machine that, owing to the peculiar implementation characteristics, is capable of offering the highest guarantees of reliability and safety in its operation.

A further object of the present invention is to overcome the drawbacks of the background art in a manner that is alternative to any existing solutions.

Another object of the invention is to provide a labeling machine that is easily produced and of low cost.

Further characteristics and advantages of the invention will become better apparent from the description of a preferred, but not exclusive, embodiment of the labeling machine according to the invention, which is illustrated by way of non-limiting example in the accompanying drawings wherein.

Figure 1:
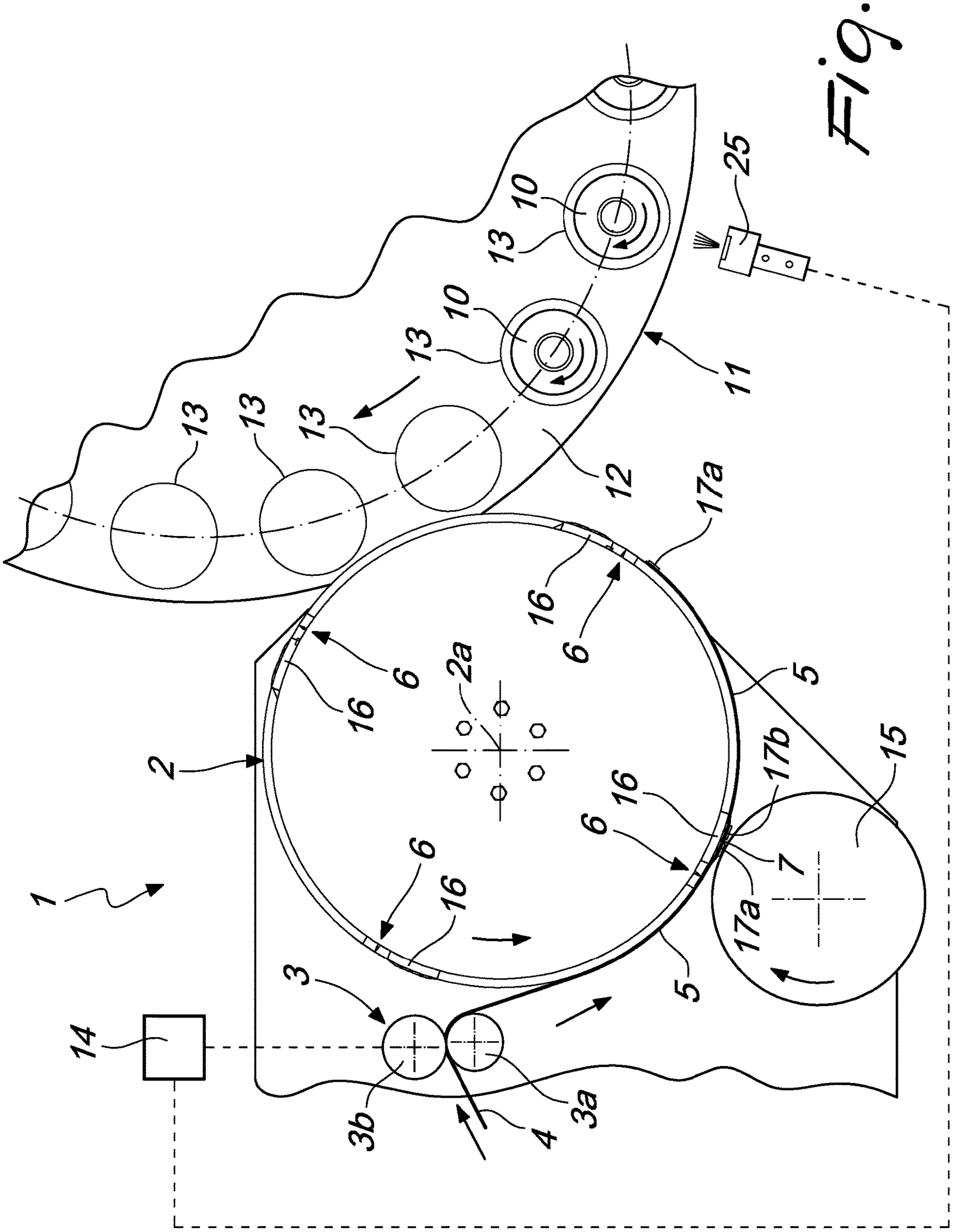
FIGS. 1 to 6 are schematic views from above of the machine according to the invention in a sequence of steps of its operation.

With reference to the figures, the labeling machine according to the invention, generally designated by the reference numeral 1, comprises a transfer drum 2 which is rotationally actuated, about its own axis 2*a*, at a given peripheral speed.

The transfer drum 2 is fed by an unwinding assembly 3 for unwinding a labeling ribbon 4, along the extension of which multiple labels 5 are printed continuously.

The labeling ribbon 4 can be of the pre-glued type or, as in the case shown, there can be means of application of adhesive on the labeling ribbon 4, which will be better described below.

The portion of the labeling ribbon 4 received from the labeling drum 2 remains adhered on the lateral surface of the transfer drum itself by virtue of the suction action obtained using air suction holes defined on its lateral surface.

The transfer drum 2 is, furthermore, provided with cutting means 6 and, more preferably, with a plurality of cutting means 6, which are arranged mutually angularly spaced apart about the axis 2*a* of the transfer drum itself.

The cutting means 6 can be actuated on command by respective actuation means, in order to carry out the cutting of the labeling ribbon 4 at the separation zone 7 between two consecutive labels 5 arranged along the labeling ribbon 4.

In its rotary movement, the transfer drum 2 transfers the individual labels 5, separated after cutting, in contact with corresponding containers 10, which are moved by a conveyor 11, which is conveniently constituted, as shown in the figures, by a carousel 12 which is provided, at its peripheral region, with a plurality of rotating pans 13 each one of which supports an individual container 10.

The portion of lateral surface of the transfer drum 2 between two consecutive cutting means 6 defines a "sector" or "division" of the transfer drum which is intended to be occupied by a single label 5 to be transferred to the containers 10.

The unwinding assembly 3 is conveniently constituted by a pair of motorized entrainment rollers 3*a*, 3*b*, engaging the labeling ribbon 4 on mutually opposite sides, and is drivable by control means 14 the function of which is to control the speed with which the labeling ribbon 4 is fed to the transfer drum 2 by the unwinding assembly 3.

In particular, the control means 14 are adapted to command, during the rotation of the transfer drum 2, variations of the speed with which the labeling ribbon 4 is fed to the transfer drum 2 by the unwinding assembly 3, with respect to the normal feeding speed of the labeling ribbon 4 to the transfer drum 2 which is substantially equal to the peripheral speed of the transfer drum 2 and to the arrival speed of the containers 10 on the conveyor 11.

According to the invention, the control means 14 are adapted to command at least one first slowing of the feeding speed of the labeling ribbon 4, with respect to the peripheral speed of the transfer drum 2, during the activation of the cutting means 6 which separate from the labeling ribbon 4 the label 5 intended to be applied on the first container 10 arriving from the conveyor 11 immediately after the last one that was labeled.

More specifically, the control means 14 are adapted to command such first slowing of the feeding speed of the labeling ribbon 4 to the transfer drum 2 immediately after the beginning of the activation of the actuation means of the cutting means 6.

In this manner, during the action of the cutting means 6, the labeling ribbon 4 undergoes a traction action, produced by the slowing of its feeding speed to the transfer drum 2 and by the consequent slipping of the lateral surface of the transfer drum 2 on the labeling ribbon 4, which favors the cutting action by the cutting means 6, thus ensuring the successful cutting of the labeling ribbon 4 in any active condition of the cutting means 6.

If a labeling ribbon 4 is used which is not pre-glued, the machine according to the invention has, as mentioned above, means of application of adhesive which can, advantageously, be provided by an adhesive spreading roller 15, which is arranged facing toward the lateral surface of the transfer drum 2.

In this case, the transfer drum 2 is peripherally provided with a plurality of adhesive bonding zones 16, which are mutually angularly spaced apart about the axis 2*a* of the transfer drum 2.

In particular, the adhesive bonding zones 16 are constituted by "runners" and are arranged, with at least one portion thereof, in relief with respect to the lateral surface of the transfer drum 2.

More specifically, the adhesive bonding zones 16 are intended to receive by resting thereon the leading and trailing edges of the labels 5 on the labeling ribbon 4, in order to allow, in cooperation with the spreading roller 15, the application of strips of adhesive 17*a*, 17*b*, respectively, on the leading and trailing edges of two consecutive labels 5 on the labeling ribbon 4, prior to their separation as a result of the activation of the cutting means 6, which operate at the separation zone 7 between the two labels 5 consecutive.

In the embodiment shown, each one of the adhesive bonding zones 16 is associated with respective cutting means 6, which are positioned to the rear of the corresponding adhesive bonding zone 16, along the direction of rotation of the transfer drum 2.

In this case, before the above mentioned first slowing of the feeding speed of the labeling ribbon 4 there is, advantageously, at least one second slowing of the feeding speed of the labeling ribbon 4 in order to allow the positioning of cutting means 6 of the transfer drum 2 at the separation zone 7 between a label 5 that is to be cut from the labeling ribbon 4 in order to be transferred to the container 10 arriving from the conveyor 11 and the label 5 immediately following arranged on the labeling ribbon 4.

More in detail, in this case, the control means 14 are, conveniently, programmed to command, first, such second slowing of the feeding speed of the labeling ribbon 4 to the transfer drum 2, with respect to the peripheral speed of the transfer drum itself, and subsequently to command the aforesaid first slowing of the feeding speed of the labeling ribbon 4.

In particular, the second slowing of the feeding speed of the labeling ribbon 4 is performed after the passage, in front of the spreading roller 15, of the adhesive bonding zone 16 on which the labeling ribbon 4 rests, so as to bring the cutting means 6 corresponding to the adhesive bonding zone 16 on which the labeling ribbon 4 rests to the separation zone 7 of the two consecutive labels 5 on which the spreading roller 15 has applied the adhesive.

In practice, following the second slowing of the feeding speed of the labeling ribbon 4 to the transfer drum 2, there is a slipping of the transfer drum 2 on the labeling ribbon 4 with consequent positioning, at the separation zone 7 between the two consecutive labels 5, of the cutting means 6 corresponding to the adhesive bonding zone 16 on which the portion of the labeling ribbon 4 was resting which immediately before had received the strips of adhesive 17*a* and 17*b* from the spreading roller 15.

It should be noted that the actuation means 14, in the time interval between the second slowing and the first slowing, are adapted to command the unwinding assembly 3 in order to bring the feeding speed of the labeling ribbon 4 to the transfer drum 2 substantially to the same value as the peripheral speed of the transfer drum 2.

Basically, following the second slowing, the feeding speed of the labeling ribbon 4 is maintained by the unwinding assembly 3 at a value lower than that of the peripheral speed of the transfer drum 2 at least until the cutting means 6 are brought to the separation zone 7 between the two consecutive labels 5 that have just received the adhesive on their leading and trailing edges 17*a* and 17*b*, after which the control means 14 command the unwinding assembly 3 to return the feeding speed of the labeling ribbon 4 to the same value as the peripheral speed of the transfer drum 2, so that the labeling ribbon moves synchronously with the periphery of the transfer drum and consequently the cutting means 6 stay in the position reached in which they are situated at the separation zone 7 between the two consecutive labels 5.

However, after, the first slowing of the feeding speed of the labeling ribbon 4, the unwinding assembly 3 maintains the feeding speed of the labeling ribbon 4 at least for as long as the actuation means of the cutting means 6 remain activated and the separation of the label 5 that has to be cut from the rest of the labeling ribbon 4 has not been completed, by virtue also of the stretching to which the labeling ribbon is subjected owing to the first slowing of the feeding speed of the labeling ribbon itself commanded by the control means 14.

Advantageously, the feeding speed of the labeling ribbon 4 is maintained at a value lower than the peripheral speed of the transfer drum 2 even after the complete separation of the label 5 to be cut from the rest of the labeling ribbon 4, at least for a preset rotation angle performed by the transfer drum 2, so that the separated label 5, kept adhered on the lateral surface of the transfer drum 2, is moved away from the rest of the labeling ribbon 4, for at least one preset angular portion; after which the control means 14 command the unwinding assembly 3 to return the feeding speed of the labeling ribbon 4 to the same value as the peripheral speed of the transfer drum 2.

Again with reference to the embodiment shown in the figures, each one of the cutting means 6 comprises a respective blade 18, which is fixed integrally to the transfer drum and is accommodated in a respective cutting chamber 19, which is open at the lateral surface of the transfer drum 2 and can be connected to air suction means.

Figure 7:
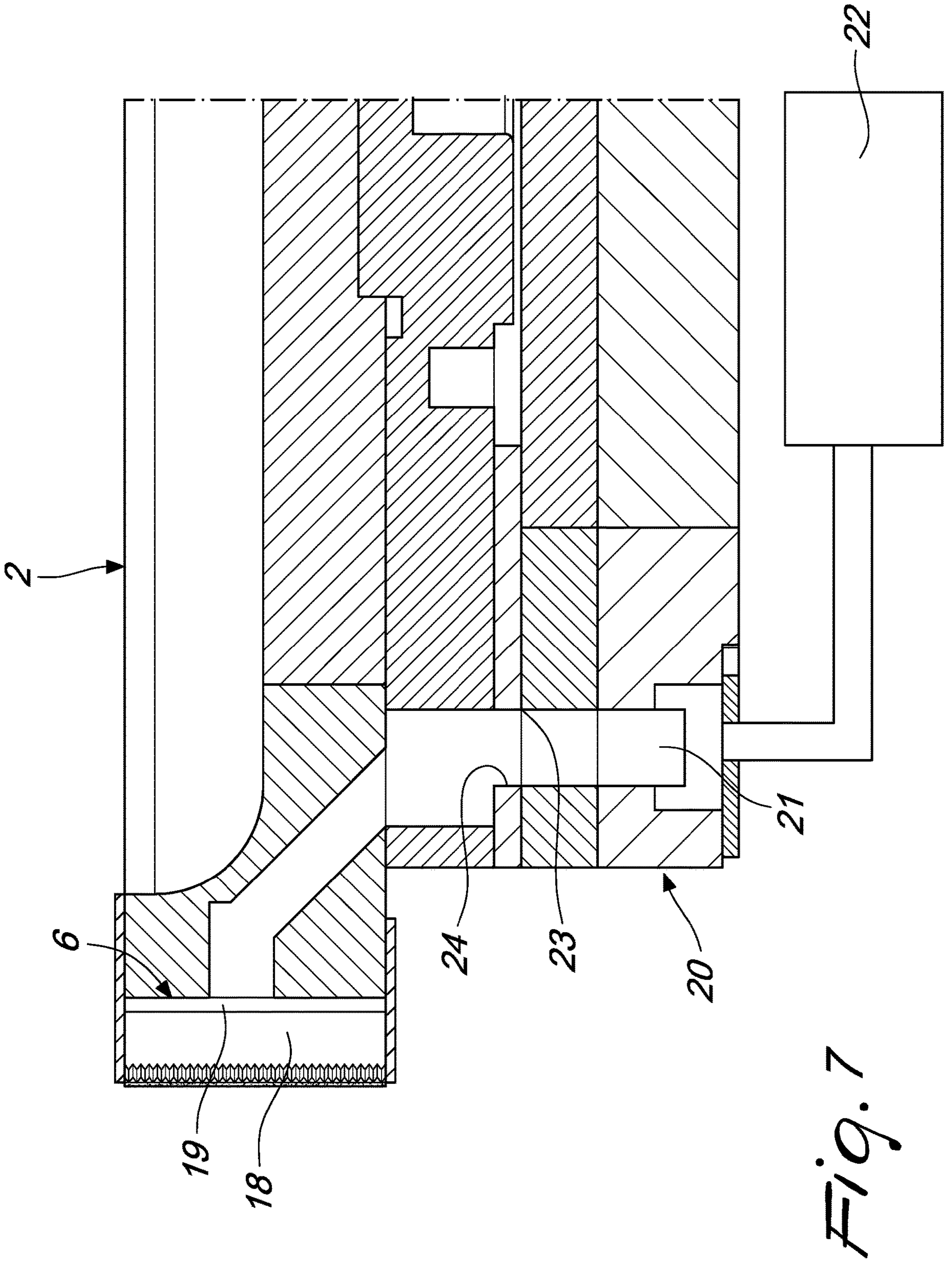
FIG. 7 is a schematic cross-sectional view taken along a radial plane of a portion of the transfer drum of the machine according to the invention.

As shown in FIG. 7, the transfer drum 2 is mounted so that it can rotate on a fixed vacuum distributor 20, in which at least one vacuum chamber 21 is defined which is connected to a vacuum generator 22 and is provided with a communication opening 23 defined on the face of the distributor 20 directed toward the transfer drum 2.

Advantageously, the cutting chamber 19 of each one of the cutting means 6 is, in turn, in communication with a connecting opening 24 defined on the face of the transfer drum 2 directed toward the distributor 20.

Figure 8:
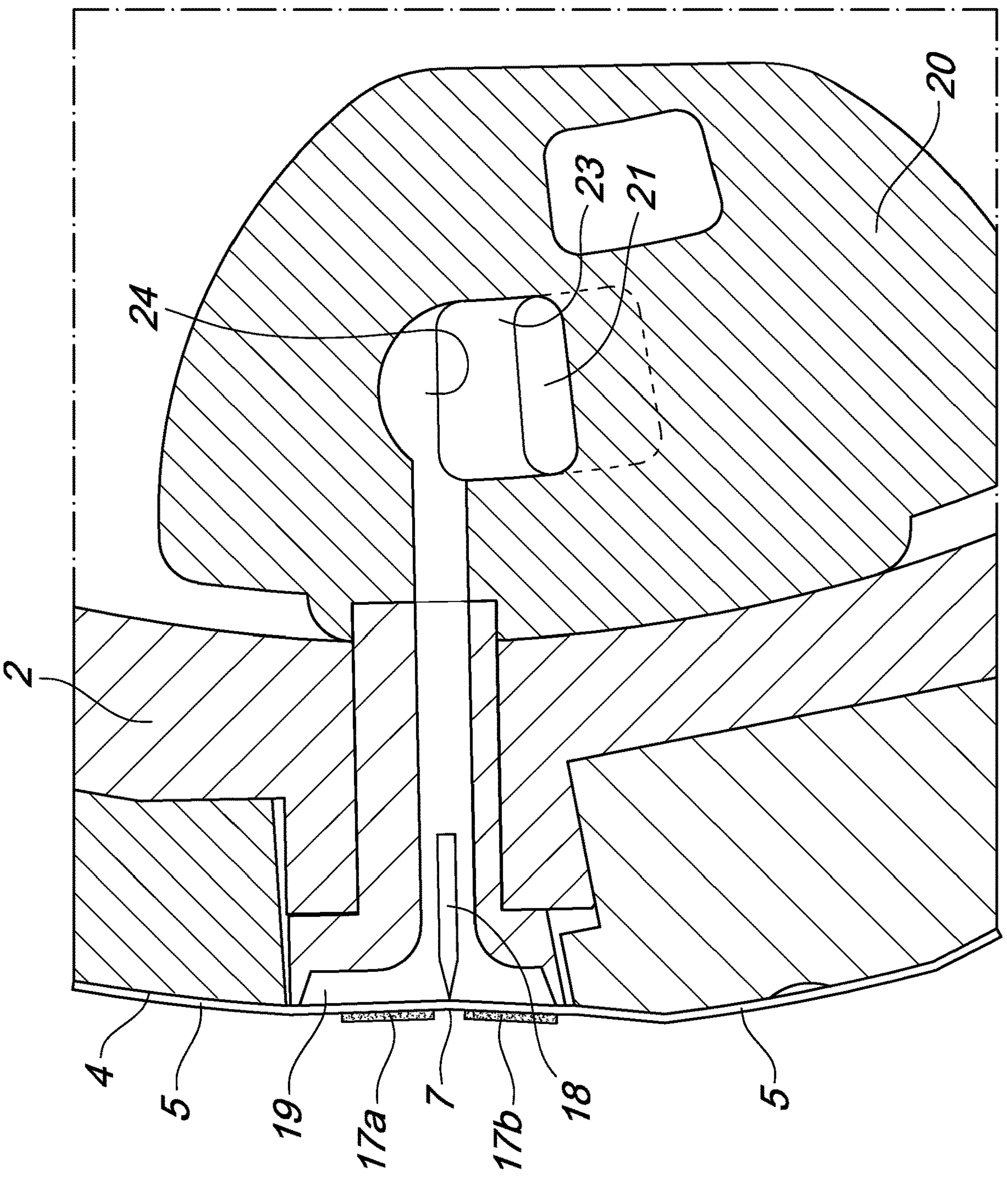
FIG. 8 is a schematic cross-sectional view of a detail of the transfer drum, taken along a plane perpendicular to its rotation axis.

In particular, the control means 14 are adapted to command the first slowing of the feeding speed of the labeling ribbon 4 immediately after the connecting opening 24 of the cutting means 6 arranged at the separation zone 7 between the label 5 to be cut and the following label 5 arranged on the labeling ribbon 4 reaches the communication opening 23 of the vacuum chamber 21, during the rotation of the transfer drum 2, with consequent connection between the vacuum generator 22 and the cutting chamber 19, so as to determine the suction of the separation zone 7 into the cutting chamber 19 and, therefore, the engagement of the separation zone 7 against the blade 18 which thus performs the cutting thereof, as shown in FIG. 8.

It should be noted that, in the absence of containers 10, in order to prevent the cutting and the transport of labels by the transfer drum, there is, conveniently, proximate to the conveyor 11, a sensor 25, provided for example by a photocell, which is designed to send a clearance signal to the control means 14 to command the feeding of the labeling ribbon 4 by the unwinding assembly 3, as a consequence of the actual presence of corresponding containers 10 on the pans 13 of the carousel 12.

The operation of the machine, according to the invention, is the following.

FIG. 1 shows a first step of operation of the machine, in which the labeling ribbon 4 is fed by the unwinding assembly 3 to the transfer drum 2 with a feeding speed substantially equal to the peripheral speed of the transfer drum 2 and is kept adhered on the lateral surface of the transfer drum 2 with the trailing and leading edges of two consecutive labels 5 and the corresponding separation zone 7 arranged at an adhesive bonding zone 16 of the transfer drum 2.

In particular, in the step of FIG. 1, the adhesive bonding zone 16 where the trailing and leading edges of the two consecutive labels 5 are resting, pass by the spreading roller 15, which applies strips of adhesive 17*a* and 17*b* on the leading and trailing edges of the two respective labels 5.

Figure 2:
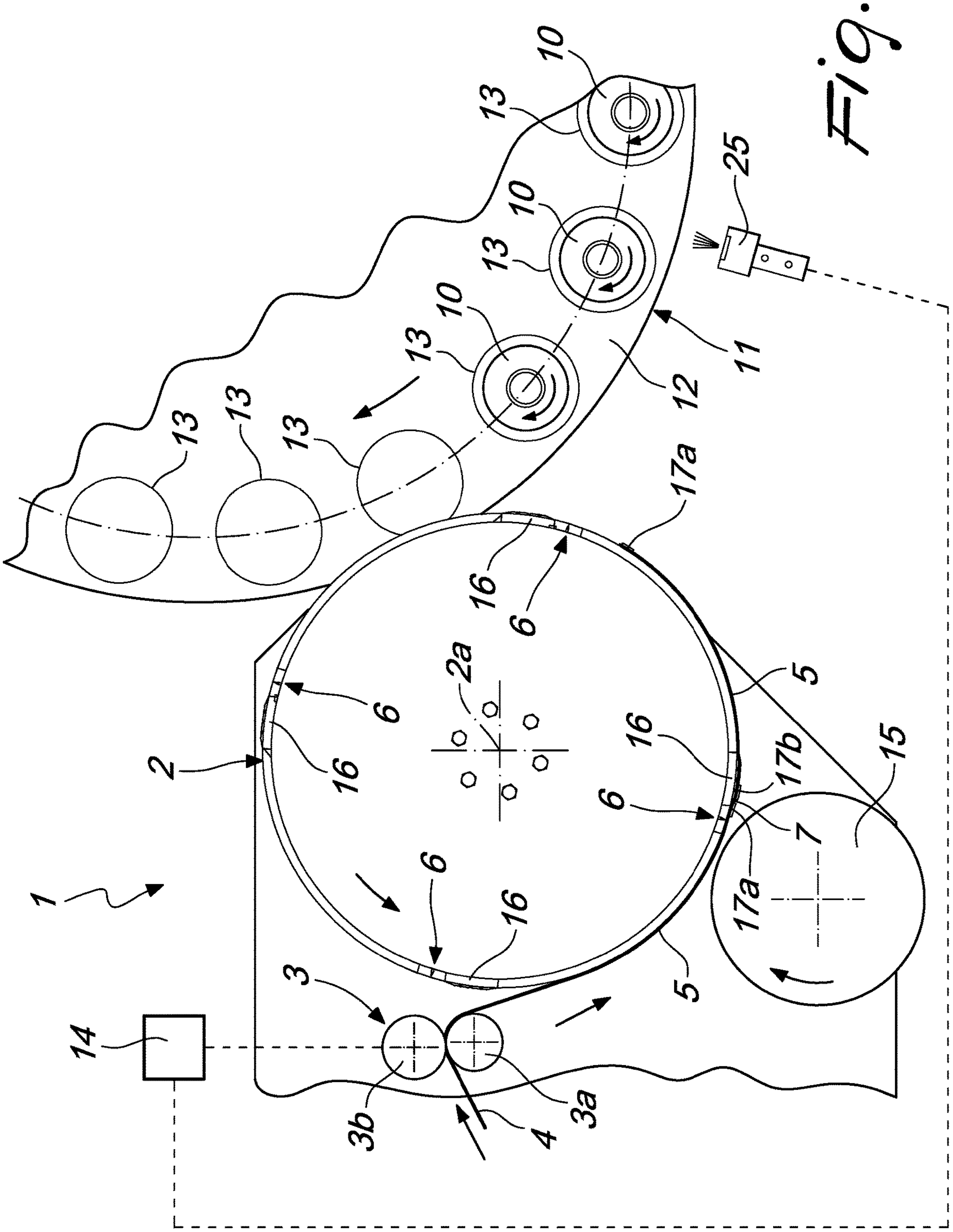

FIG. 2 shows a second step of operation, after the first step, in which the control means 14 command the unwinding assembly 3 to perform the second slowing of the feeding speed of the labeling ribbon 4 to the transfer drum 2, in order to bring the feeding speed of the labeling ribbon 4 to a value lower than the peripheral speed of the transfer drum 2, so that the cutting means 6 immediately behind the adhesive bonding zone 16, which in the first step passed by the spreading roller 15, are brought, following a slipping of the transfer drum 2 on the labeling ribbon 4, to the separation zone 7 between the two labels 5 on which the spreading roller 15 has applied the strips of adhesive 17*a* and 17*b*.

Figure 3:
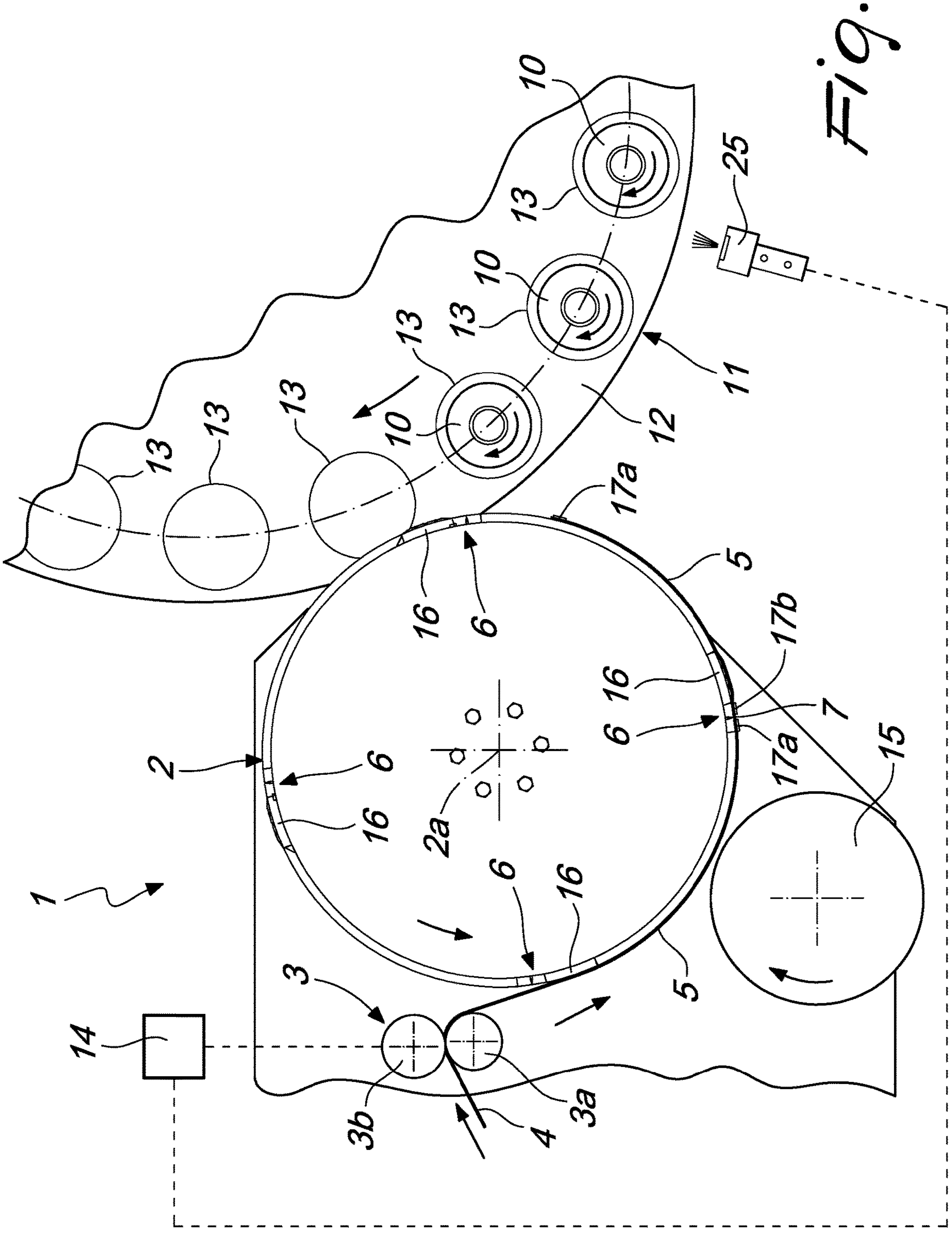

FIG. 3 shows a third step of operation, after the second step, in which, once the cutting means 6 have reached the separation zone 7 of the two consecutive labels 5, the unwinding assembly 3 is again actuated under the command of the control means 14 so that the feeding speed of the labeling ribbon 4 is substantially equal to the peripheral speed of the transfer drum 2, so that the cutting means 6 and the corresponding separation zone 7 between the two labels 5, to which the cutting means 6 have been brought, can be moved in a synchronized fashion toward the conveyor 11.

Figure 4:
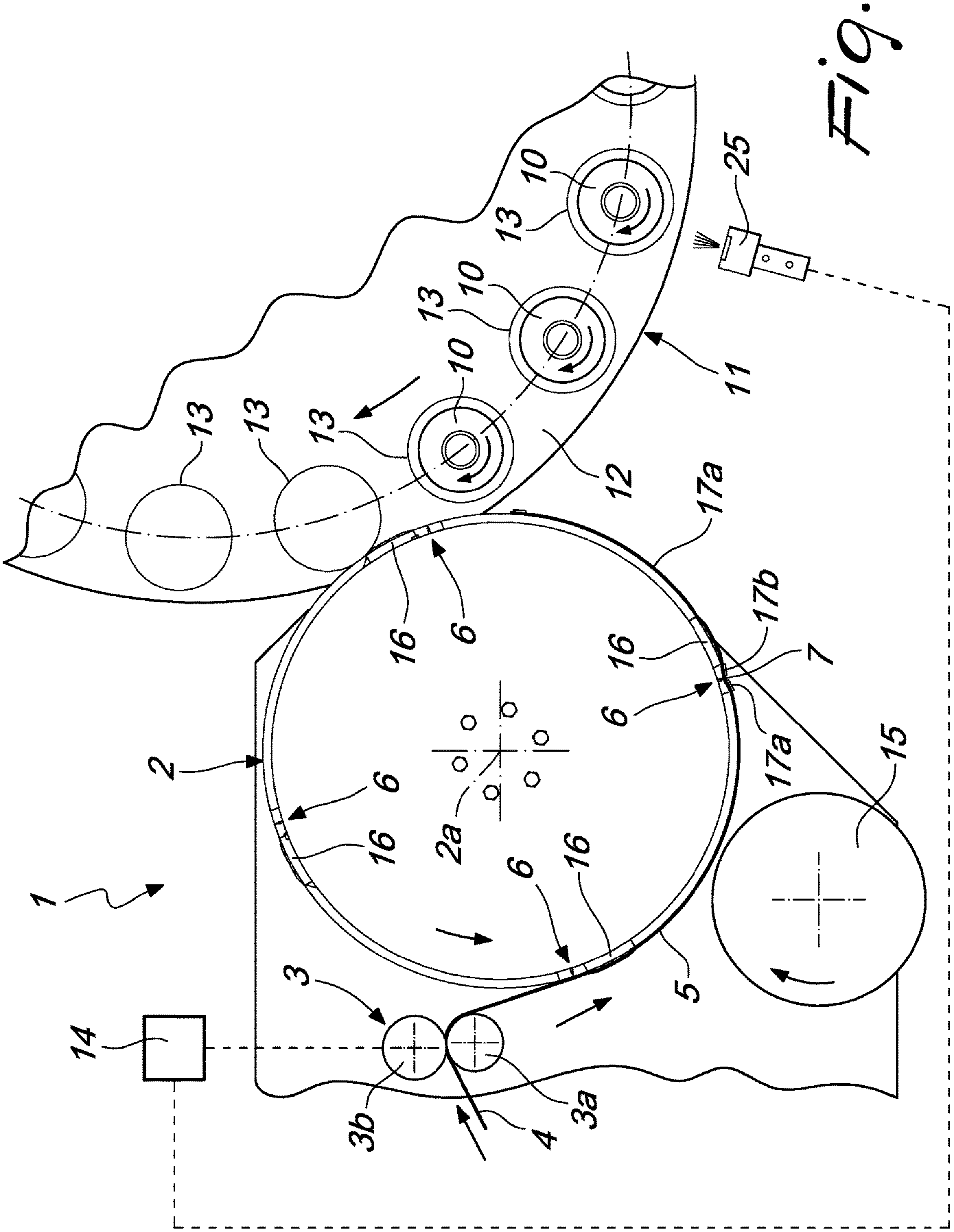

FIG. 4 shows a fourth step of operation, in which the cutting means 6 arranged at the separation zone 7 between the two consecutive labels 5 reach the angular position in which the corresponding actuation means are activated i.e. their connecting opening 24 reaches the communication opening 23 of the vacuum chamber 21, so that the separation zone 7 is sucked into the cutting chamber 19 and brought against the blade 18, which thus begins to carry out the cutting.

As shown in FIG. 4, during the activation of the actuation means of the cutting means 6 and, preferably, immediately after starting the suction of the separation zone 7 into the cutting chamber 19, the control means 14 command the unwinding assembly 3 to perform the first slowing of the feeding speed of the labeling ribbon 4 to the transfer drum 2, so as to bring the feeding speed of the labeling ribbon 4 to a value lower than the peripheral speed of the transfer drum 2, so as to apply a traction action on the labeling ribbon 4 which facilitates the cutting action performed on the labeling ribbon 4 by the cutting means 6 or, in any case, facilitates the final separation of the label 5 to be cut from the rest of the labeling ribbon, if the cut performed by the cutting means 6 on the labeling ribbon 4 should be incomplete or partial, for example as a result of wear of the blade 18, so ensuring the successful cutting of the label 5 in any operating condition of the machine.

Figure 5:
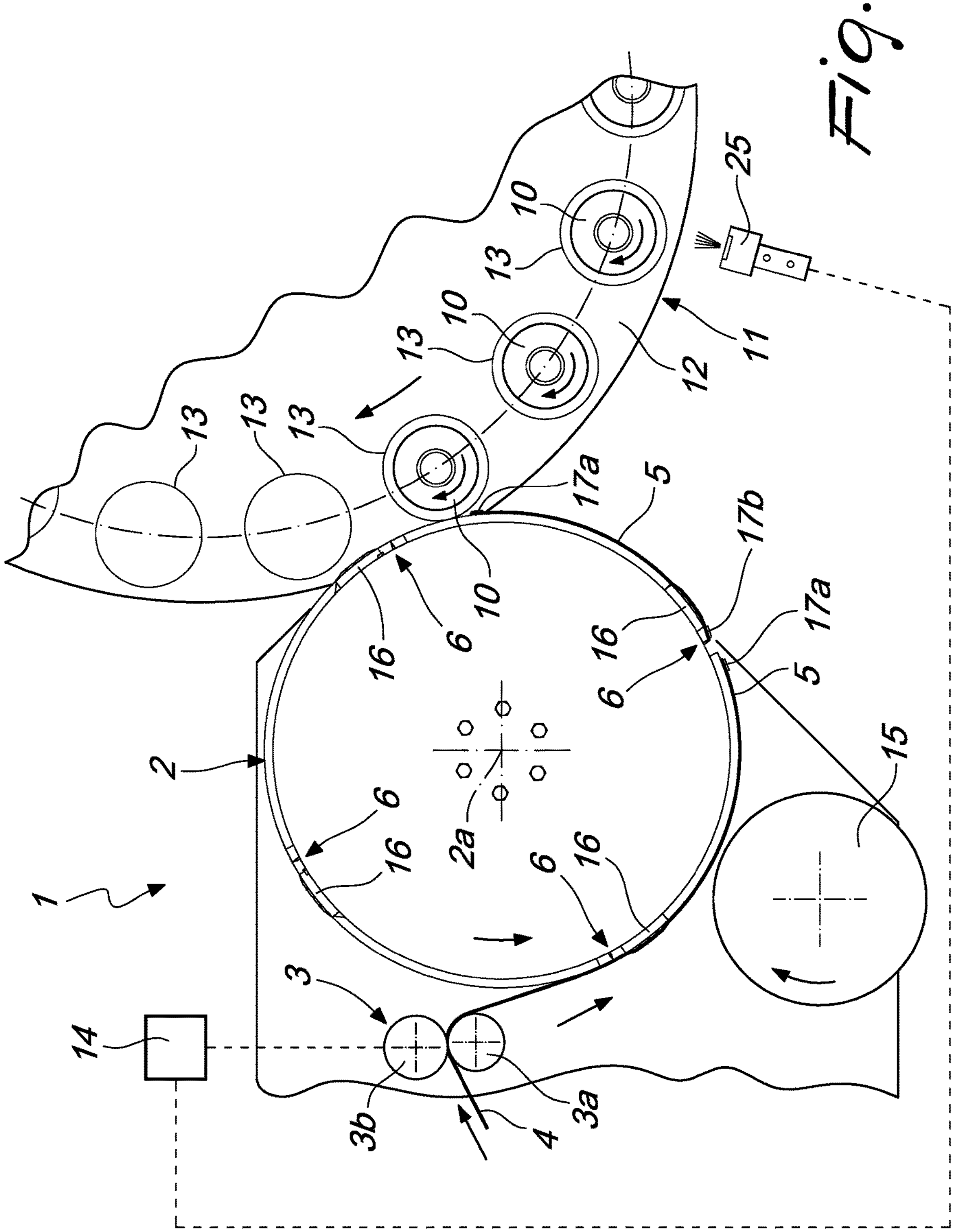

After the deactivation of the actuation means of the cutting means 6, i.e., while the transfer drum 2 continues to rotate about its own axis 2*a*, after the connecting opening 24 of the cutting chamber 19 has passed by the region where the communication opening 23 of the vacuum chamber 21 is located, with consequent interruption of the suction action exerted by the cutting chamber 19 on the labeling ribbon 4, the feeding speed of the labeling ribbon 4 is maintained by the unwinding assembly 3 at a value lower than the peripheral speed of the transfer drum 2, so as to move the cut label 5 away from the rest of the labeling ribbon 4 and position the subsequent adhesive bonding zone 16 at the separation zone between the subsequent two consecutive labels 5 of the labeling ribbon 5, as shown in FIG. 5.

It should be noted that the feeding speed of the labeling ribbon 4 is maintained at a value lower than the peripheral speed of the transfer drum 2 not necessarily after the deactivation of the actuation means of the cutting means 6, but at least until the subsequent adhesive bonding zone 16 has reached the separation zone 7 between the successive two consecutive labels 5 of the labeling ribbon 4.

Figure 6:
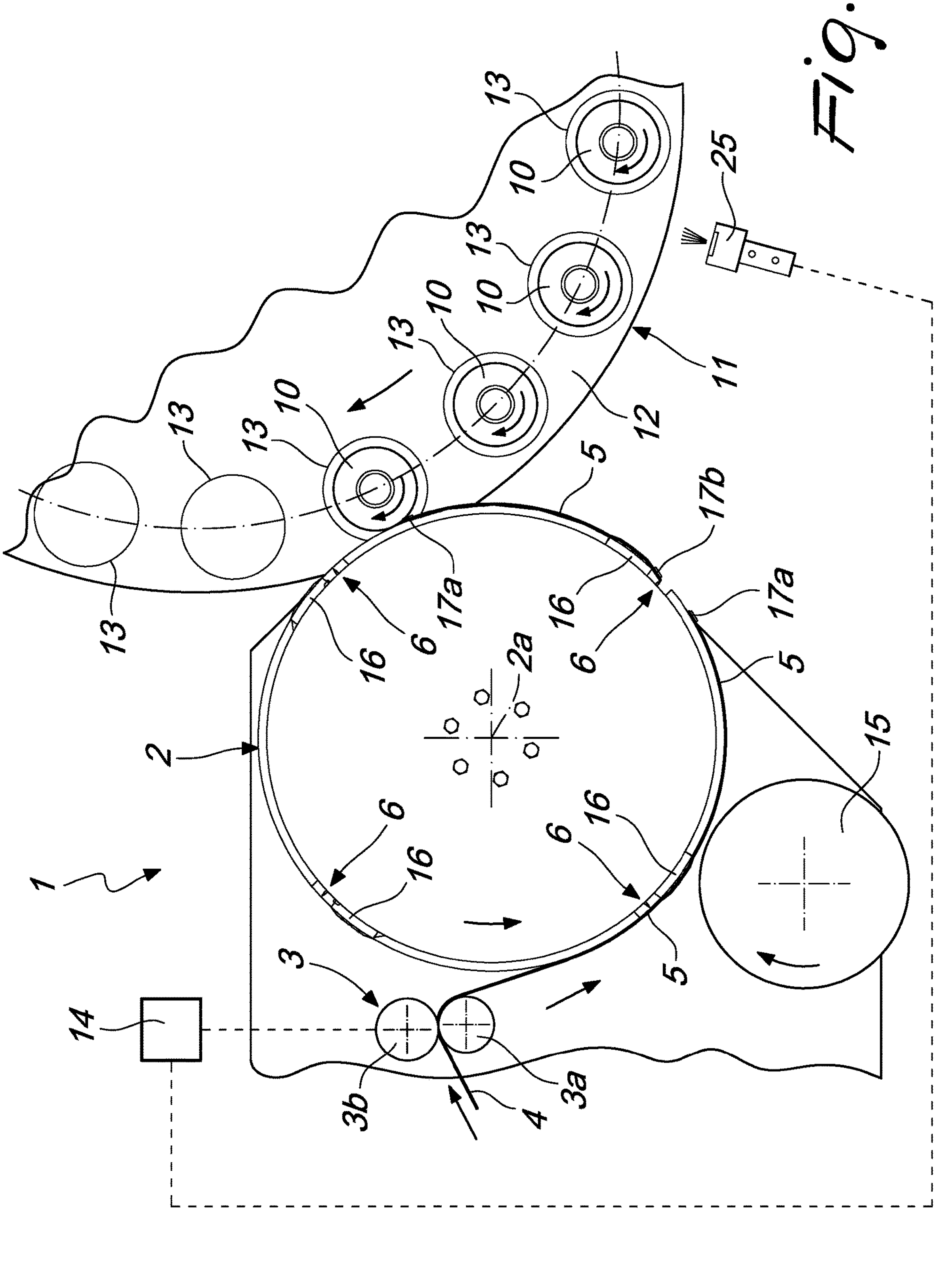

As soon as the subsequent adhesive bonding zone 16 is in position at the separation zone 7 between the subsequent two consecutive labels 5 of the labeling ribbon 4, the control means 14 command the unwinding assembly 3 to return the feeding speed of the labeling ribbon 4 to the same value as the peripheral speed of the transfer drum 2, so that, while the transfer drum 2, in continuing in its rotation about its axis 2*a*, brings the cut label 5 toward the zone where the cut label 5 is transferred to the corresponding container 10 arriving on the conveyor 11, the separation zone 7 between the subsequent two consecutive labels 5 can reach the zone where the spreading roller 15 is situated, as shown in FIG. 6, so as to resume the cycle of operation as described above.

If the sensor 25 detects the absence of one or more containers 10 on the conveyor 11, after the adhesive bonding zone 16 on which rests the trailing edge of the label 5 intended for the last container 10 present before the absence passes in front of the spreading roller 15, the control means 14 command the arrest, or possibly the slowing, of the unwinding assembly 3, so that no label is dispensed by the transfer drum 2 at the absence.

Subsequently, when the sensor 25 detects the presence of the first container 10 after the absence, the control means 14 command the reactivation of the unwinding assembly 3, so that the transfer drum 2 can resume dispensing the labels to the containers 10 arriving from the conveyor 11.

In practice it has been found that the invention fully achieves the intended aim and objects by providing a machine for labeling containers that is capable of ensuring the cutting of the labels even under suboptimal operating conditions of the cutting means.

The invention thus conceived is susceptible of numerous modifications and variations, all of which are within the scope of the appended claims. Moreover, all the details may be substituted by other, technically equivalent elements.

Thus, for example, the cutting means can also be provided by respective blades mounted on the transfer drum 2 and actuatable to move by respective actuation means which are constituted, conveniently, by respective actuating cylinders.

In practice, the materials used, as well as the contingent shapes and dimensions, may be any according to the requirements and to the state of the art.

The disclosures in Italian Patent Application No. 102020000006937 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A machine for labeling containers, comprising a transfer drum which can move rotatably, about an axis, with a given peripheral speed and is fed by an unwinding assembly for unwinding a labeling ribbon along an extension of which a plurality of labels are printed continuously, said transfer drum being provided with cutting means, which are mutually angularly spaced apart around said axis and are configured to be activated on command by respective actuation means, in order to carry out a cutting of said labeling ribbon at a separation zone between two consecutive labels, said transfer drum being adapted to transfer, in a rotary motion thereof about said axis, the individual labels, separated after cutting, in contact with corresponding containers which are moved by a conveyor, said unwinding assembly being drivable by a controller configured to command, during the rotation of said transfer drum about said axis, at least one variation of a feeding speed of said labeling ribbon to said transfer drum by said unwinding assembly, with respect to a peripheral speed of said transfer drum, wherein said controller is configured to (i) command an initial slowing of the feeding speed of said labeling ribbon to said transfer drum to less than the peripheral speed of said transfer drum in order to bring said cutting means into alignment with said separation zone, (ii) after the initial slowing, bring the feeding speed of said labeling ribbon to substantially the same as the peripheral speed of said transfer drum and (iii)

immediately after beginning of an activation of said actuation means of said cutting means, command another slowing of the feeding speed of said labeling ribbon to said transfer drum to less than the peripheral speed of said transfer drum such that the another slowing occurs during activation of said cutting means to cut said labeling ribbon.

2. The machine according to claim 1, further comprising an adhesive spreading roller which faces said transfer drum, said transfer drum being provided peripherally with a plurality of adhesive bonding zones, which are mutually angularly spaced apart around the axis of said transfer drum, said adhesive bonding zones being arranged, with at least a portion thereof, in relief with respect to a lateral surface of said transfer drum and being designed to receive by resting thereon leading and trailing edges of the labels that are present on said labeling ribbon, in order to allow, in cooperation with said adhesive spreading roller, the application of respective strips of adhesive onto the leading and trailing edges of two consecutive labels that are present on said labeling ribbon, prior to their separation from said labeling ribbon performed following the activation of said cutting means; respective cutting means corresponding to cutting said labeling ribbon being associated with each one of said adhesive bonding zones and arranged to a rear of the corresponding adhesive bonding zone, along a direction of rotation of said transfer drum about said axis.

3. The machine according to claim 1, wherein said cutting means comprise a respective blade, which is fixed integrally to said transfer drum and is accommodated in a respective cutting chamber, which is open at the lateral surface of said transfer drum and is selectively connectable to air suction means.

4. The machine according to claim 3, wherein said transfer drum is mounted rotatably on a fixed vacuum distributor which defines at least one vacuum chamber connected to a vacuum generator and provided with a communication opening defined on a face of said distributor that is directed toward said transfer drum, the cutting chamber of each one of said cutting means has a connecting opening defined on a face of said transfer drum that is directed toward said distributor, said controller being configured to command said another slowing of the feeding speed of said labeling ribbon after said connecting opening of said cutting means arranged at the separation zone between the label to be cut and the following label of said labeling ribbon reaches said communication opening of said vacuum chamber, during the rotation of said transfer drum about its own axis.

5. The machine according to claim 1, wherein the another slowing of the feeding speed of said labeling ribbon to said transfer drum during activation of said cutting means results in slippage of a lateral surface of said transfer drum relative to said labeling ribbon.

6. A method for labeling containers, which comprises the steps of feeding, by means of an unwinding assembly, a labeling ribbon, along an extension of which multiple labels are printed continuously, to a transfer drum provided with cutting means, with a feeding speed that is substantially equal to a peripheral speed of said transfer drum, carrying out the cutting of said labeling ribbon at a separation zone between two consecutive labels, bringing, by means of said transfer drum, individual labels separated after cutting into contact with corresponding containers arriving from a conveyor, further comprising initially slowing the feeding speed of said labeling ribbon to said transfer drum with respect to the peripheral speed of said transfer drum to less than the peripheral speed of said transfer drum in order to bring said cutting means into alignment with said separation zone, (ii) after the step of initially slowing, bringing the feeding speed of said labeling ribbon to substantially equal to the peripheral speed of said transfer drum and (iii) immediately after beginning of an activation of an actuation means of said cutting means, carrying out another slowing of the feeding speed of said labeling ribbon to said transfer drum to less than the peripheral speed of said transfer drum such that the another slowing occurs, at least during cutting of said labeling ribbon by said cutting means.

7. The method according to claim 6, wherein said step of another slowing the feeding speed of said labeling ribbon to said transfer drum with respect to the peripheral speed of said transfer drum, at least during cutting of said labeling ribbon, results in slippage of a lateral surface of said transfer drum relative to said labeling ribbon during cutting of said labeling ribbon.

* * * * *